US008277191B2

(12) United States Patent
Ammann

(10) Patent No.: US 8,277,191 B2
(45) Date of Patent: Oct. 2, 2012

(54) APPARATUS FOR BUCKET COVER PLATE RETENTION

(75) Inventor: Luke J. Ammann, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 754 days.

(21) Appl. No.: 12/392,956

(22) Filed: Feb. 25, 2009

(65) Prior Publication Data

US 2010/0215501 A1 Aug. 26, 2010

(51) Int. Cl.
*B64C 11/04* (2006.01)

(52) U.S. Cl. .................................................... 416/220 R

(58) Field of Classification Search .............. 416/219 R, 416/220 R, 193 A, 244 R, 244 A, 248
See application file for complete search history.

(56) References Cited

U.S. PATENT DOCUMENTS 3,137,478 A 6/1964 Farrell
6,190,131 B1 2/2001 Deallenbach
2009/0022592 A1 * 1/2009 Liotta et al. ............... 416/220 R

* cited by examiner

*Primary Examiner* — Robert Pascal
*Assistant Examiner* — Gerald Stevens
(74) *Attorney, Agent, or Firm* — Fletcher Yoder P.C.

(57) ABSTRACT

In one embodiment, a system includes a turbine engine that includes a turbine stage including a turbine rotor having multiple blades disposed in a first annular arrangement. The turbine engine also includes multiple cover plates disposed in a second annular arrangement along interfaces between the turbine rotor and the blades. The turbine engine further includes multiple lugs coupled to the turbine stage and a first ring coupled to the lugs to hold the cover plates to the turbine stage.

16 Claims, 8 Drawing Sheets

FIG. 4
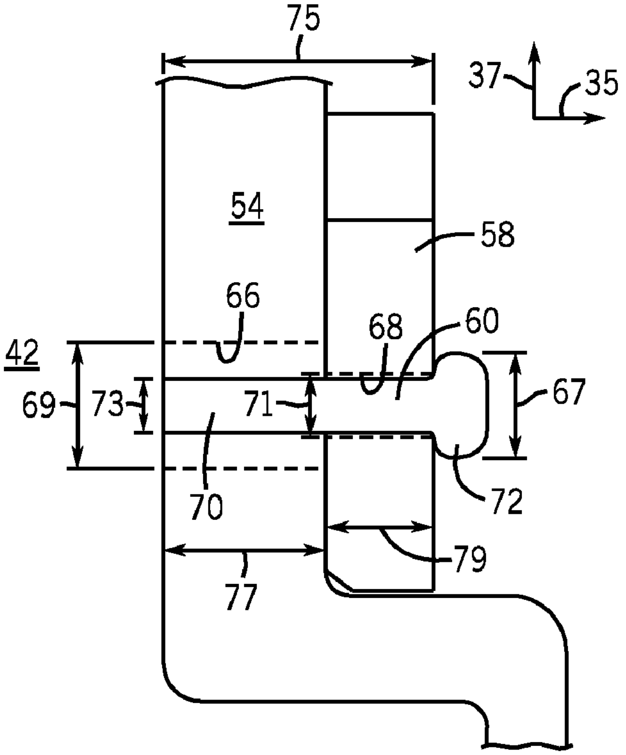
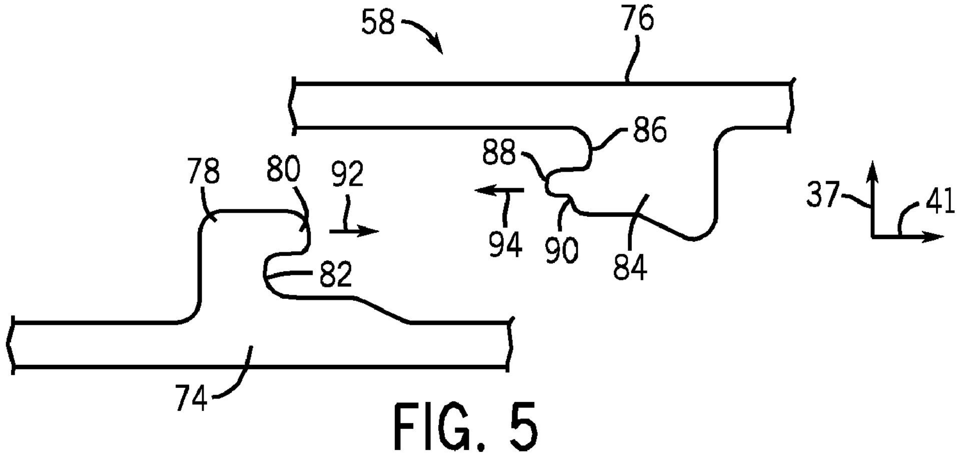
FIG. 5
FIG. 6
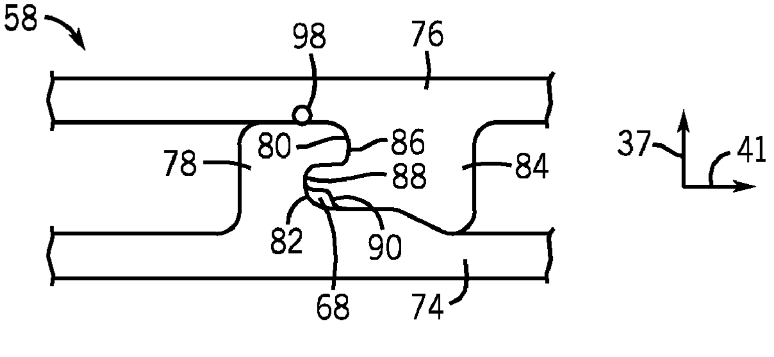

APPARATUS FOR BUCKET COVER PLATE RETENTION

BACKGROUND OF THE INVENTION

The subject matter disclosed herein relates to gas turbine engines, and more specifically, to bucket cover plates.

In general, gas turbine engines combust a mixture of compressed air and fuel to produce hot combustion gases. The combustion gases may flow through one or more turbine stages to generate power for a load and/or a compressor. Each turbine stage may include multiple buckets with cover plates disposed circumferentially around a central rotor. Unfortunately, any bolts, screws, pins or other fasteners used to secure the cover plates to the buckets may be dropped into the gas turbine engine during maintenance. For example, certain maintenance procedures involve removing cover plates to access various components of the turbine. Such procedures generally include removing the fasteners that secure the cover plates to the buckets. Therefore, the more cover plate fasteners employed, the greater the possibility that these fasteners will be dropped into the turbine during or after removal. If fasteners fall into inaccessible areas of the turbine, further disassembly may be necessary to remove the parts, thereby delaying turbine operation and increasing maintenance costs.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine engine that includes a turbine stage including a turbine rotor having multiple blades disposed in a first annular arrangement. The turbine engine also includes multiple cover plates disposed in a second annular arrangement along interfaces between the turbine rotor and the blades. The turbine engine further includes multiple lugs coupled to the turbine stage and a first ring coupled to the lugs to hold the cover plates to the turbine stage.

In a second embodiment, a system includes a turbine stage that includes a lug having a shaft and a head sized larger than the shaft. The shaft and head are configured to extend through a cover plate, and the lug is configured to receive an interlocking feature between the cover plate and the head to hold the cover plate to the turbine stage.

In a third embodiment, a system includes a turbine stage that includes a first ring including a first set of interlocking features configured to at least partially capture multiple lugs to retain multiple cover plates.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a cutaway side view of a cover plate and axial retention ring assembly taken within line 4-4 of FIG. 3 in accordance with certain embodiments of the present technique;

FIG. 5 is a front view of a portion of the axial retention ring assembly, as shown in FIG. 4, prior to engagement in accordance with certain embodiments of the present technique;

FIG. 6 is a front view of a portion of the axial retention ring assembly, as shown in FIG. 4, after engagement in accordance with certain embodiments of the present technique;

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may secure cover plates to turbine stage components (e.g., rotor, buckets, other cover plates, etc.) in an axial direction with a minimal number of parts. Minimizing the number of connecting parts may reduce the possibility that parts may be dropped into the turbine engine during maintenance. Certain embodiments may secure the cover plates to the turbine stage with lugs coupled to the rotor. Each lug may include a shaft and a head sized larger than the shaft. The lug may pass through a hole in the cover plate and secure the cover plate to the rotor via an interlocking feature that captures the lug between the cover plate and the head of the lug. In other embodiments, the lug may include a curved shaft that biases the head toward the bucket. In this configuration, the head of the lug may press against the interlocking feature, thereby holding the cover plate onto the bucket. In a further embodiment, a ring assembly may be used, possibly in conjunction with the lugs, to secure the cover plates to the turbine stage. The ring assembly may include a pair of interlocking rings that provide holes when interlocked. Lugs may pass through these holes to secure the cover plates to the rotor. For example, first and second rings may rotate in opposite circumferential directions to capture and secure the lugs. Further embodiments may secure cover plates in the axial direction with lugs coupled to the buckets and/or other cover plates.

Figure 1:
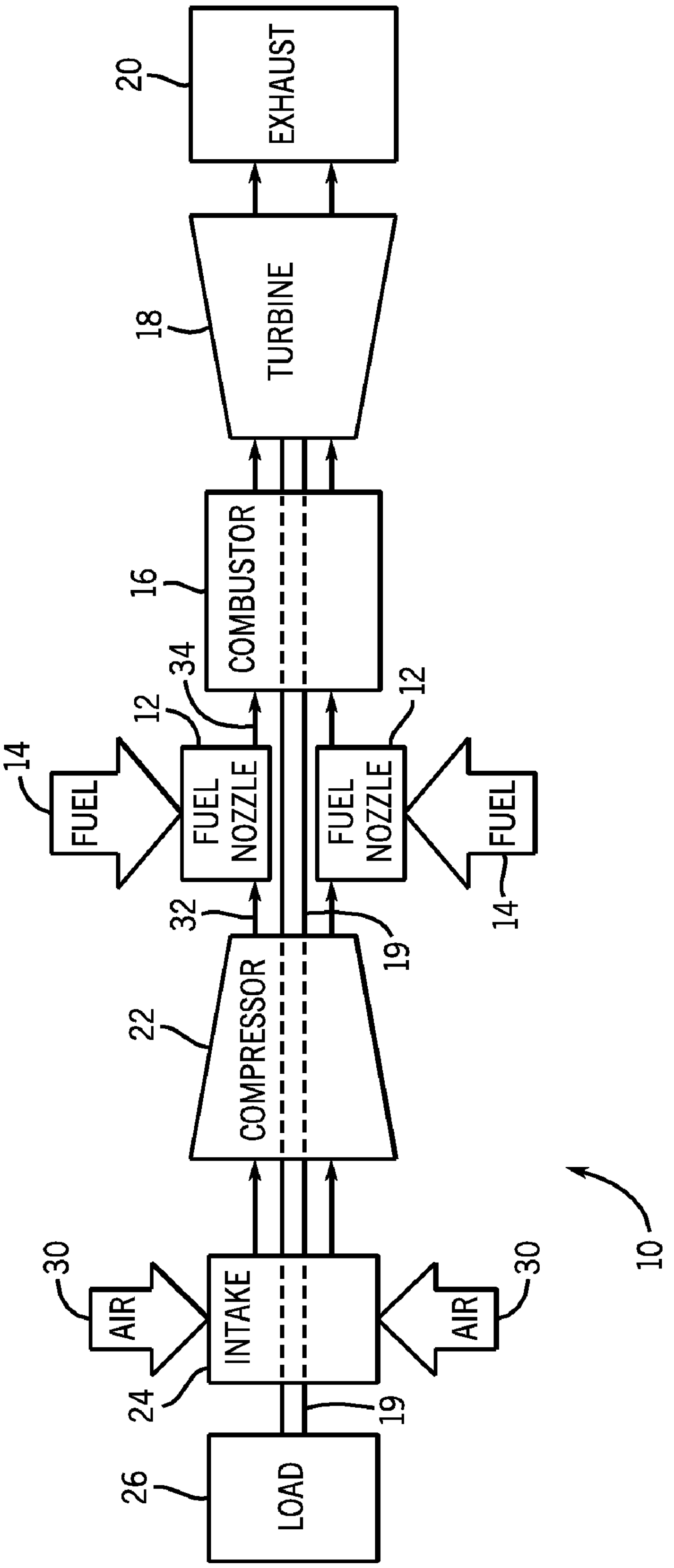
FIG. 1 is a block diagram of a turbine system having a turbine that includes an axial retention system for cover plates that minimizes the quantity of mounting parts in accordance with certain embodiments of the present technique.

Turning now to the drawings and referring first to FIG. 1, a block diagram of an embodiment of a gas turbine system 10 is illustrated. The diagram includes fuel nozzle 12, fuel supply 14, and combustor 16. As depicted, fuel supply 14 routes a liquid fuel and/or gas fuel, such as natural gas, to the turbine system 10 through fuel nozzle 12 into combustor 16. The combustor 16 ignites and combusts the fuel-air mixture, and then passes hot pressurized exhaust gas into a turbine 18. The exhaust gas passes through turbine blades in the turbine 18, thereby driving the turbine 18 to rotate. In the present embodiment, cover plates are mounted adjacent to the turbine blades to block hot combustion gases from entering a rotor that couples the turbine blades to a shaft 19. As discussed in detail below, embodiments of turbine system 10 include certain structures and components within turbine 18 that reduce the number of parts connecting cover plates to stages of turbine 18. The coupling between blades in turbine 18 and shaft 19 will cause the rotation of shaft 19, which is also coupled to several components throughout the turbine system 10, as illustrated. Eventually, the exhaust of the combustion process may exit the turbine system 10 via exhaust outlet 20.

In an embodiment of turbine system 10, compressor vanes or blades are included as components of compressor 22. Blades within compressor 22 may be coupled to shaft 19, and will rotate as shaft 19 is driven to rotate by turbine 18. Compressor 22 may intake air to turbine system 10 via air intake 24. Further, shaft 19 may be coupled to load 26, which may be powered via rotation of shaft 19. As appreciated, load 26 may be any suitable device that may generate power via the rotational output of turbine system 10, such as a power generation plant or an external mechanical load. For example, load 26 may include an electrical generator, a propeller of an airplane, and so forth. Air intake 24 draws air 30 into turbine system 10 via a suitable mechanism, such as a cold air intake, for subsequent mixture of air 30 with fuel supply 14 via fuel nozzle 12. As will be discussed in detail below, air 30 taken in by turbine system 10 may be fed and compressed into pressurized air by rotating blades within compressor 22. The pressurized air may then be fed into fuel nozzle 12, as shown by arrow 32. Fuel nozzle 12 may then mix the pressurized air and fuel, shown by numeral 34, to produce a suitable mixture ratio for combustion, e.g., a combustion that causes the fuel to more completely burn, so as not to waste fuel or cause excess emissions.

Figure 2:
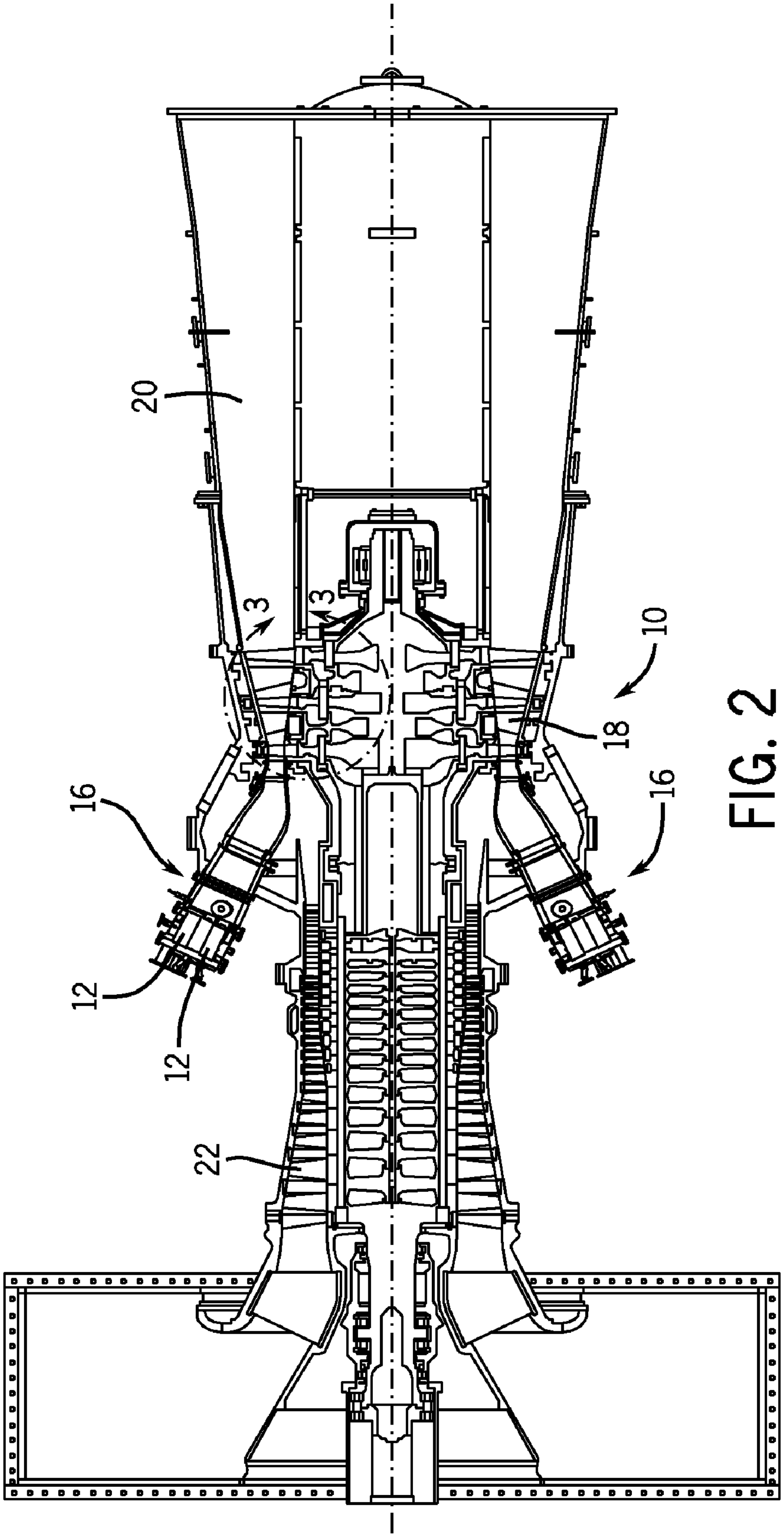
FIG. 2 is a cutaway side view of the turbine system, as shown in FIG. 1, in accordance with certain embodiments of the present technique.

FIG. 2 shows a cutaway side view of an embodiment of turbine system 10. As depicted, the embodiment includes compressor 22, which is coupled to an annular array of combustors 16, e.g., six, eight, ten, or twelve combustors 16. Each combustor 16 includes at least one fuel nozzle 12 (e.g., 1, 2, 3, 4, 5, 6, 7, 8, 9, 10, or more), which feeds an air-fuel mixture to a combustion zone located within each combustor 16. Combustion of the air-fuel mixture within combustors 16 will cause vanes or blades within turbine 18 to rotate as exhaust gas passes toward exhaust outlet 20. As discussed in detail below, certain embodiments of turbine 18 include a variety of unique features to reduce the number of parts that connect cover plates to stages of turbine 18.

Figure 3:
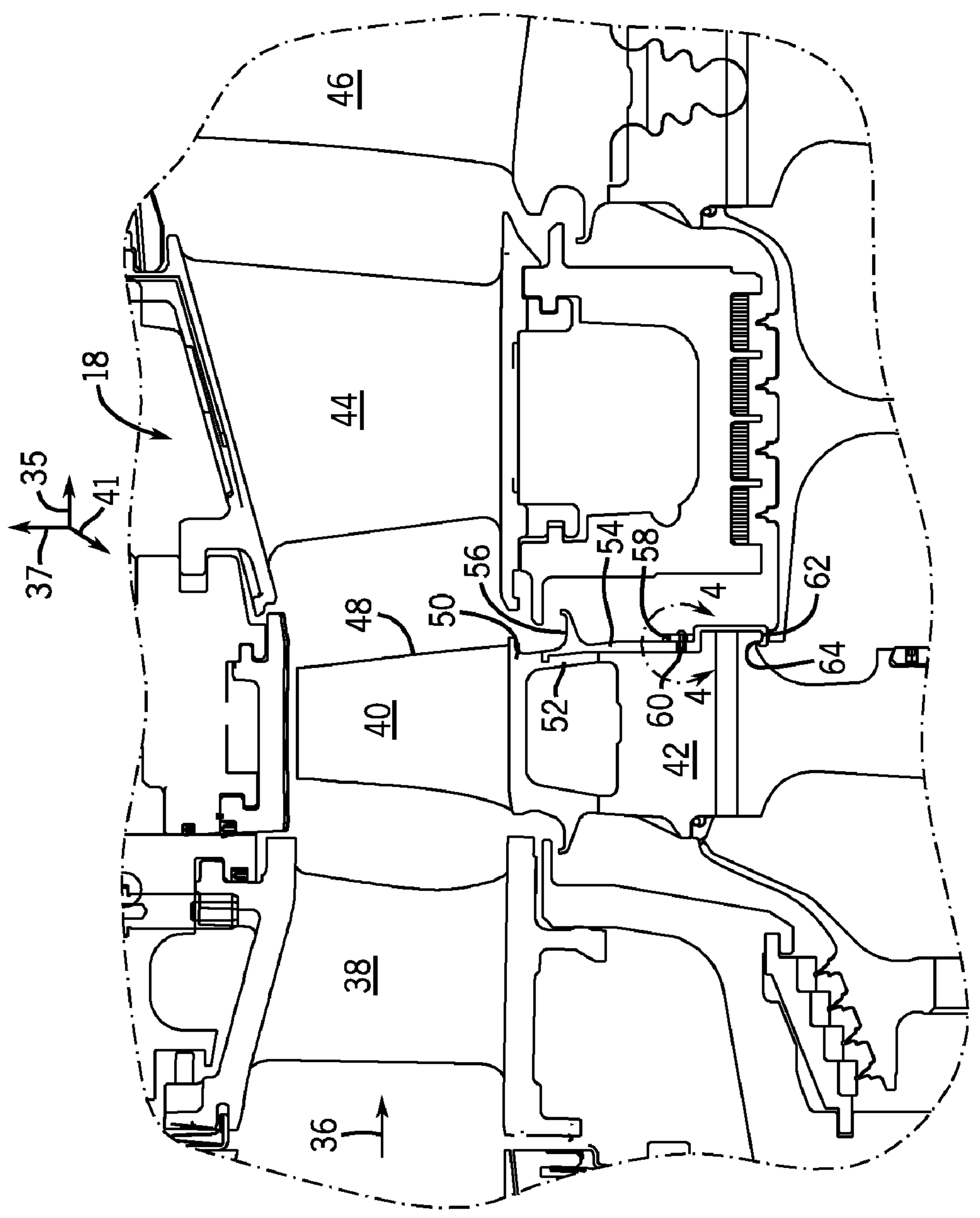
FIG. 3 is a cutaway side view of a turbine section taken within line 3-3 of FIG. 2 in accordance with certain embodiments of the present technique.

FIG. 3 presents a detailed cross-sectional view of turbine 18 taken within line 3-3 of FIG. 2. Hot gas from the combustors 16 flows into the turbine 18 in an axial direction 35, as illustrated by arrow 36. The turbine 18 illustrated in the present embodiment includes three turbine stages. However, only the first two stages are shown in FIG. 3. Other turbine configurations may include more or fewer turbine stages. For example, a turbine may include 1, 2, 3, 4, 5, 6, or more turbine stages. The first turbine stage includes nozzles 38 and buckets 40 substantially equally spaced in a circumferential direction 41 about turbine 18. The first stage nozzles 38 are rigidly mounted to turbine 18 and configured to direct combustion gases toward buckets 40. The first stage buckets 40 are mounted to a rotor 42 that is driven to rotate by combustion gases flowing through the buckets 40. The rotor 42, in turn, is coupled to the shaft 19, which drives compressor 22 and load 26. The combustion gases then flow through second stage nozzles 44 and second stage buckets 46. The second stage buckets 46 are also coupled to rotor 42. Finally, the combustion gases flow through third stage nozzles and buckets (not shown). As the combustion gases flow through each stage, energy from the combustion gases is converted into rotational energy of the rotor 42. After passing through each turbine stage, the combustion gases exit the turbine 18 in the axial direction 35.

Each first stage bucket 40 includes an airfoil 48, a platform 50 and a shank 52. A cover plate 54 is mounted adjacent to shank 52 and rotor 42, and secured in both axial direction 35 and radial direction 37. Cover plate 54 may include a seal, or angel wing, 56 configured to block hot combustion gases from entering rotor 42. Cover plate 54 is secured to bucket 40 in axial direction 35 via a combination of an axial retention ring assembly 58 and a lug 60. As discussed in detail below, lug 60 may be coupled to rotor 42, shank 52 or a second cover plate on a substantially opposite axial side of bucket 40. Lug 60, oriented in axial direction 35, passes through a hole in cover plate 54 and is secured by axial retention ring assembly 58. Axial retention ring assembly 58 may include a single ring having grooves configured to capture lugs 60. Alternatively, axial retention ring assembly 58 may include a pair of interlocking rings configured to provide openings that surround or capture lugs 60, thereby securing cover plates 54 to buckets 40. Axial retention ring assembly 58 may also block hot combustion gases from entering the holes in cover plates 54. In either configuration, cover plates 54 are secured in axial direction 35 without the use of bolts, screws or pins that may be dropped into turbine 18 during maintenance.

As illustrated, each cover plate 54 is secured to bucket 40 in radial direction 37 by a hook and tab connector. Specifically, cover plate 54 includes a hook 62 located at a radially inward portion of cover plate 54. Hook 62 is configured to interlock with a tab 64 disposed on rotor 42. In this manner, contact between hook 62 and tab 64 limits movement of cover plate 54 in radial direction 37 as centrifugal force from the rotating turbine urges cover plate 54 radially outward. Therefore, cover plate 54 is secured in both radial direction 37 and axial direction 35.

FIG. 4 is a detailed cross-sectional side view of lug 60, cover plate 54 and axial retention ring assembly 58 taken within line 4-4 of FIG. 3. In this embodiment, lug 60 is coupled to rotor 42. As illustrated, cover plate 54 includes a hole 66, and axial retention ring assembly 58 includes a hole 68. Lug 60 includes a shaft 70 and a head 72. A diameter 67 of head 72 is smaller than a diameter 69 of cover plate hole 66. In this configuration, cover plate 54 may be disposed adjacent to rotor 42 by aligning hole 66 with lug 60 and moving cover plate 54 and rotor 42 toward one another in axial direction 35. As a result, lug 60 passes through hole 66 in cover plate 54 such that cover plate 54 may be secured to rotor 42 by axial retention ring assembly 58. As illustrated, a diameter 71 of hole 68 in axial retention ring assembly 58 is larger than a diameter 73 of shaft 70, but smaller than diameter 67 of head 72. In this configuration, axial retention ring assembly 58 may capture shaft 70 while head 72 blocks translation of ring assembly 58 in axial direction 35. Furthermore, a length 75 of shaft 70 is substantially similar to the combined width 77 of cover plate 54 and width 79 of axial retention ring assembly 58. Therefore, when axial retention ring assembly 58 is secured to shaft 70, axial retention ring assembly 58 blocks translation of cover plate 54 in axial direction 35 by contact between ring assembly 58 and head 72. Consequently, cover plate 54 is secured in axial direction 35 without the use of bolts, screws, pins or other fasteners that may be dropped into turbine 18 during maintenance.

FIG. 5 shows a front view of a portion of axial retention ring assembly 58 prior to engagement. Axial retention ring assembly 58 may extend around the entire circumferential extent (e.g., 360 degrees) of a turbine stage or be divided into multiple segments. For example, axial retention ring assembly 58 may include 1, 2, 3, 4, 5, 6, 7, 8, 9, 10, or more segments. Furthermore, axial retention ring assembly 58 may include a single ring with hooks to secure cover plates 54 to lugs 60, or a pair of interlocking rings to capture lugs 60. The configuration illustrated in FIG. 5 represents an axial retention ring assembly 58 having a pair of interlocking rings configured to capture lugs 60 and secure cover plates 54 to a turbine stage. Specifically, axial retention ring assembly 58 includes a first ring 74 configured to interlock with a second ring 76. First ring 74 includes a first interlocking feature 78 having a hook 80 and a notch 82. Second ring 76 includes a second interlocking feature 84 having a groove 86, a tab 88 and a recess 90. First interlocking feature 78 is configured to mate with second interlocking feature 84 to capture lug 60 and secure cover plate 54 to rotor 42. Specifically, to interlock rings 74 and 76, first ring 74 is rotated in a direction 92 about a rotational axis of turbine system 10 along circumferential direction 41. Similarly, second ring 76 is rotated in a direction 94, substantially opposite direction 92, about the rotational axis of turbine system 10 along circumferential direction 41. Hook 80 is configured to fit within groove 86, and tab 88 is configured to fit within notch 82. As discussed in detail below, when first interlocking feature 78 engages second interlocking feature 84, recess 90 provides a hole 68 configured to capture lug 60. In this configuration, cover plates 54 may be secured to a turbine stage without the use of multiple pins, bolts or other fasteners that may be dropped into turbine 18 during maintenance, thereby eliminating the possibility of expensive and time-consuming disassembly to remove such dropped fasteners.

FIG. 6 shows a front view of a portion of axial retention ring assembly 58 after engagement. As illustrated, hook 80 is disposed within groove 86, and tab 88 is disposed within notch 82. Recess 90, tab 88 and notch 82 form hole 68 configured to capture lug 60. Engagement between the various components of first interlocking feature 78 and second interlocking feature 84 blocks movement of ring 74 with respect to ring 76 in radial direction 37. However, to block rotation of first ring 74 relative to second ring 76 in circumferential direction 41, a dowel 98 may be disposed through rings 74 and 76. In certain embodiments, dowel 98 may be inserted after engagement of first interlocking feature 78 with second interlocking feature 84. Dowel 98 may include a structure that rigidly attaches first ring 74 to second ring 76. In this configuration, dowel 98 may be drilled out to extract first interlocking feature 78 from second interlocking feature 84 to remove axial retention ring assembly 58 and cover plates 54. Multiple dowels 98 may be positioned around the circumference of ring assembly 58, with at least one dowel 98 disposed in each segment. Certain embodiments may employ 1, 2, 3, 4, 5, 6, 7, 8, 9, 10 or more dowels 98 per segment. However, minimizing the number of dowels 98 reduces the probability that a dowel 98 may be dropped into turbine 18 during maintenance. Therefore, this configuration facilitates attachment of cover plates 54 to a turbine stage with a minimum number of fasteners, thereby reducing the possibility of expensive and time-consuming turbine disassembly.

Figure 7:
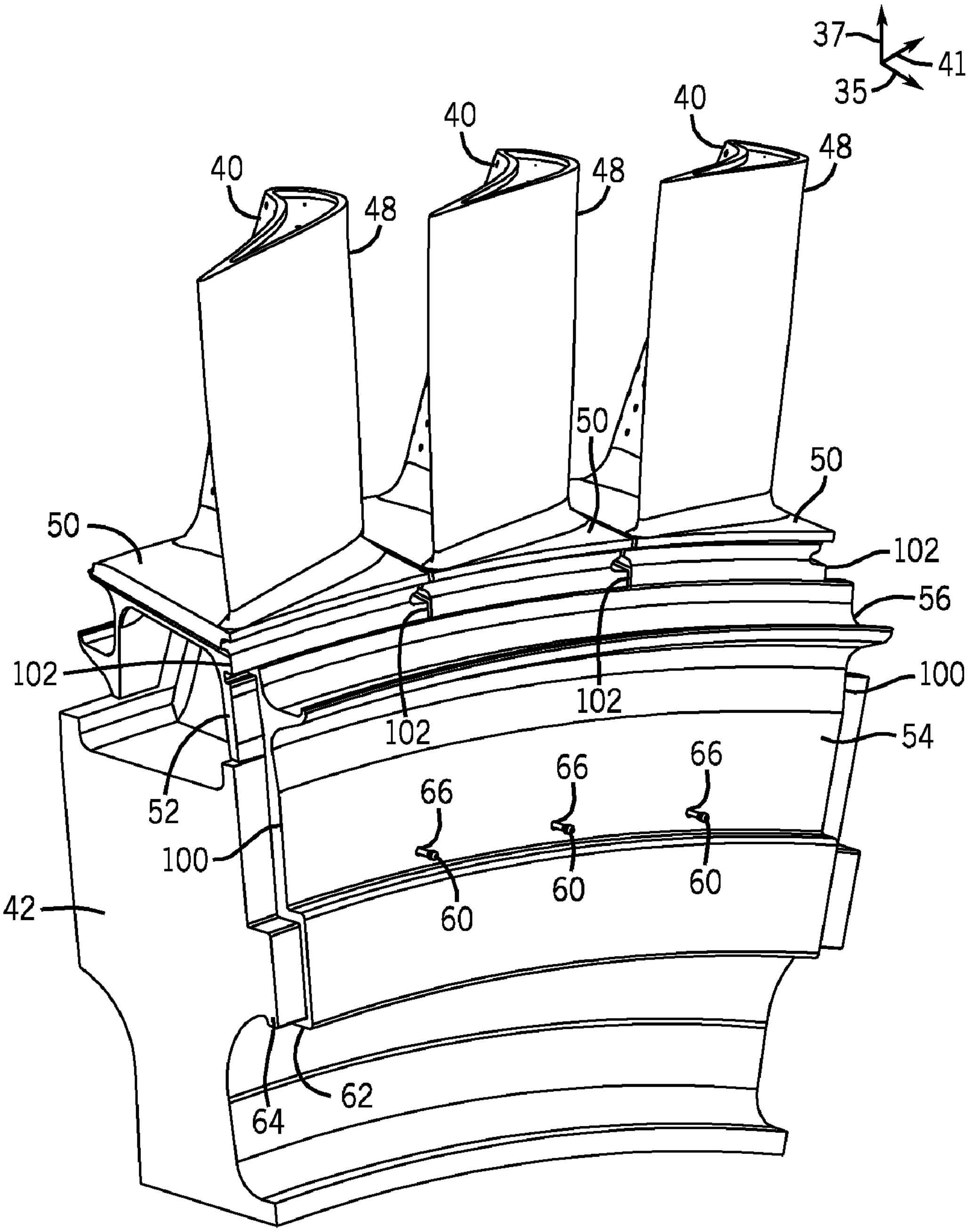
FIG. 7 is a perspective view of a cover plate coupled to a rotor and buckets, as shown in FIG. 3, with lugs passing through holes in the cover plate in accordance with certain embodiments of the present technique.

FIG. 7 shows a perspective view of a cover plate 54 coupled to a segment of rotor 42. While only one segment of rotor 42 is shown, it should be appreciated that rotor 42 is annular and extends about the entire circumference of turbine 18. Furthermore, while one cover plate 54 is shown in FIG. 7, embodiments may include multiple cover plates 54 that abut each other around the circumferential extent of rotor 42. For example, certain embodiments may include 5, 10, 15, 20, 25, 30, or more cover plates that collectively extend 360 degrees about the rotor 42. As illustrated, cover plate 54 extends in circumferential direction 41 to substantially cover three buckets 40. Other embodiments may employ cover plates 54 that substantially cover 1, 2, 4, 5, 6, 7, 8, or more buckets 40. Furthermore, each circumferential end 100 of cover plate 54 is offset from circumferential ends 102 of buckets 40. In this configuration, the interface between cover plates 54 does not coincide with the interface between buckets 40. This arrangement may facilitate increased thermal protection for rotor 42 because hot combustion gases may not pass through both the cover plate and bucket interfaces.

Similar to the embodiment described with regard to FIG. 3, lugs 60 are coupled to rotor 42. The lugs 60 pass through holes 66 within cover plate 54 to secure cover plate 54 to rotor 42. The present embodiment employs three lugs 60 to attach each cover plate 54 to rotor 42. Alternative configurations may employ 1, 2, 4, 5, 6, 7, 8, 9, 10, or more lugs 60 per cover plate 54. In addition, other embodiments may employ lugs 60 integrally coupled to shank 52 of bucket 40. In other words, lugs 60 may be formed as a part of buckets 40 (i.e., one-piece) during the bucket manufacturing process. Similar to the rotor lug configuration, each bucket 40 may include 1, 2, 3, 4, 5, 6, or more lugs 60 coupled to shank 52. As described in detail below, further embodiments may employ lugs 60 coupled to another cover plate disposed on a substantially opposite axial side of rotor 42.

Figure 8:
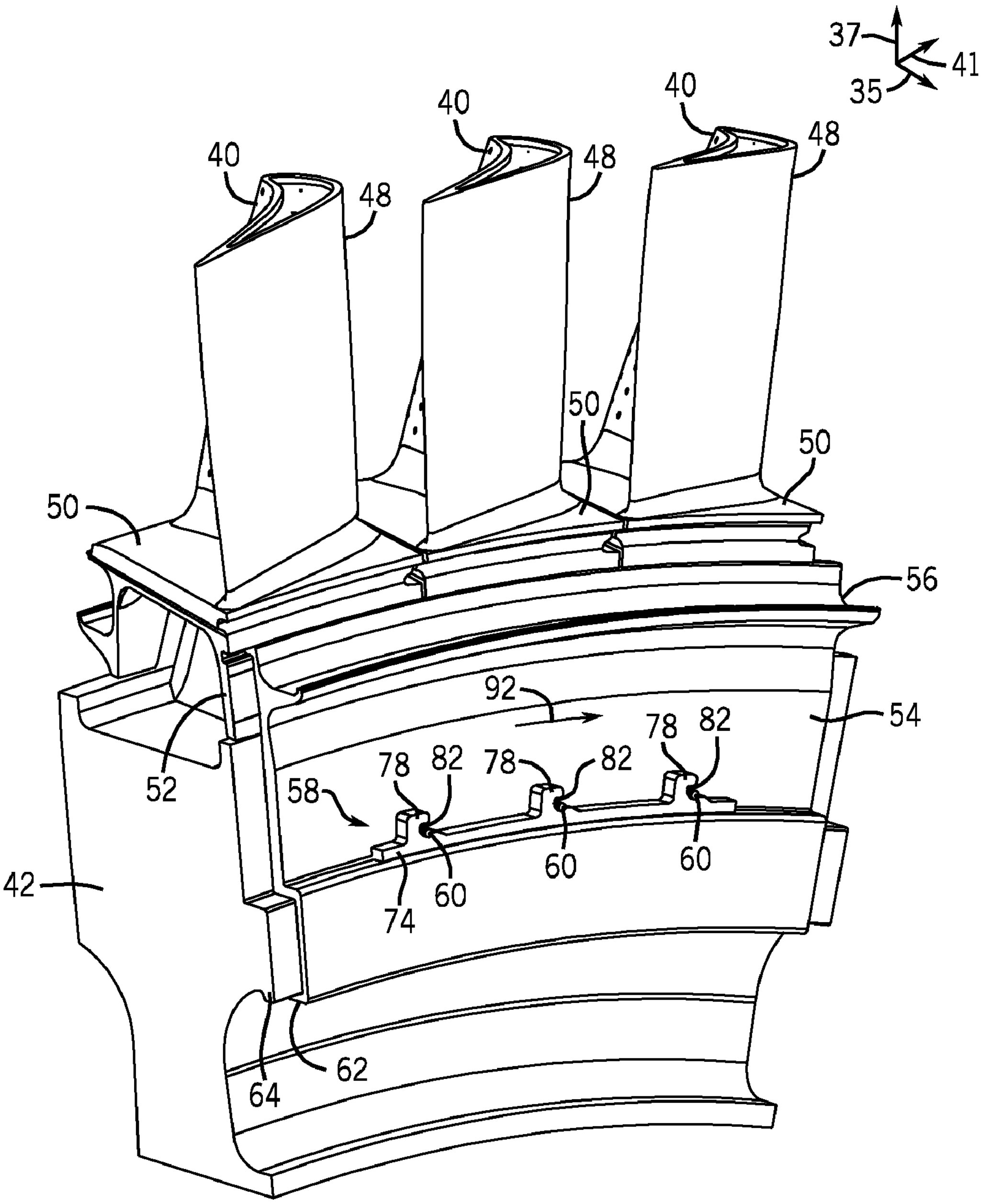
FIG. 8 is a perspective view of a cover plate coupled to the rotor and buckets, as shown in FIG. 3, with a first ring coupled to the lugs in accordance with certain embodiments of the present technique.

FIG. 8 shows a perspective view of a cover plate 54 coupled to a segment of rotor 42 with a first ring 74. As illustrated, a segment of first ring 74 is shown. Certain embodiments may employ a complete annular ring 74 that extends about the entire circumferential extent of rotor 42. Alternative embodiments may employ a series of ring segments that capture each lug 60 about the circumferential extent of rotor 42. For example, as illustrated, one ring segment may be configured to capture all of the lugs 60 passing through one cover plate 54. Alternative ring segments may be configured to capture all of the lugs 60 associated with 2, 3, 4, 5, 6, 7, 8, 9, 10, or more cover plates 54. Further embodiments may employ ring segments that capture only a portion of the lugs 60 associated with each cover plate 54. For example, certain embodiments may employ 1, 2, 3, 4, 5, or more ring segments per cover plate 54.

Ring 74, or individual segments of ring 74, may be coupled to lugs 60 by aligning first interlocking features 78 with lugs 60 and rotating ring 74, or each of its segments, in direction 92. First interlocking features 78 are configured to capture lugs 60, thereby securing cover plate 54 in axial direction 35. Certain embodiments may employ a single ring system such that ring 74, or its segments, operates alone to secure cover plate 54. For example, the diameter of notch 82 may be substantially similar to the diameter 73 of shaft 70 of lug 60. Because the diameter 67 of head 72 of lug 60 is greater than the diameter 73 of shaft 70, interaction between head 72 and first interlocking feature 78 may limit axial movement of ring 74, thereby securing cover plate 54. Alternatively, as described in detail below, first ring 74 may be interlocked with second ring 76 to capture lugs 60 and secure cover plate 54 to rotor 42. Either configuration effectively secures cover plate 54 in axial direction 35 while limiting the number of parts that may be dropped into turbine 18 during maintenance.

Figure 9:
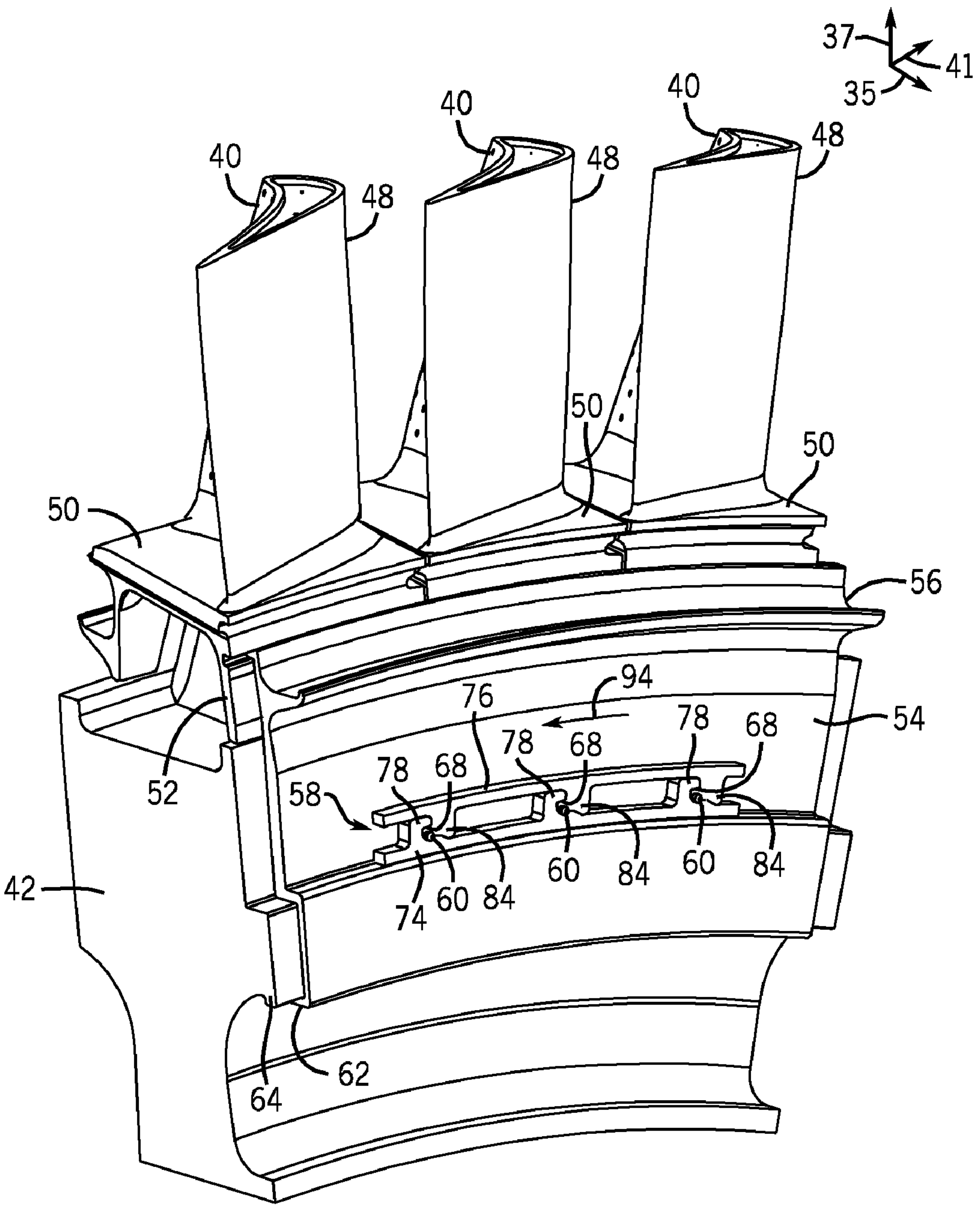
FIG. 9 is a perspective view of a cover plate coupled to the rotor and buckets, as shown in FIG. 3, with a second ring coupled to the lugs in accordance with certain embodiments of the present technique.

FIG. 9 shows a perspective view of a cover plate 54 coupled to a segment of rotor 42 with a ring assembly 58 including a first ring 74 and a second ring 76. As previously discussed, first ring 74 includes first interlocking features 78 and second ring 76 includes second interlocking features 84. Second ring 76 may be segmented in a similar manner to first ring 74, in certain embodiments. After first interlocking features 78 of ring 74 have captured lugs 60, second ring 76 may be installed to secure cover plate 54 to rotor 42. Specifically, the second interlocking features 84 of ring 76 may be aligned with lugs 60 and first interlocking features 78. Ring 76, or its segments, may then be rotated in direction 94 until second interlocking features 84 engage first interlocking features 78. First and second interlocking features 78 and 84 are configured to provide a hole 68 when interlocked. The diameter 71 of hole 68 is larger than the diameter 73 of shaft 70, but smaller than the diameter 67 of head 72. Therefore, interaction between head 72 and ring assembly 58 may limit axial movement of ring assembly 58. In this configuration, ring assembly 58 may secure cover plate 54 to rotor 42 without the use of small parts that may become lodged within turbine 18 during maintenance. Furthermore, as previously discussed, dowels 98 may be disposed axially through rings 74 and 76 to block circumferential rotation of one ring with respect to the other.

Figure 10:
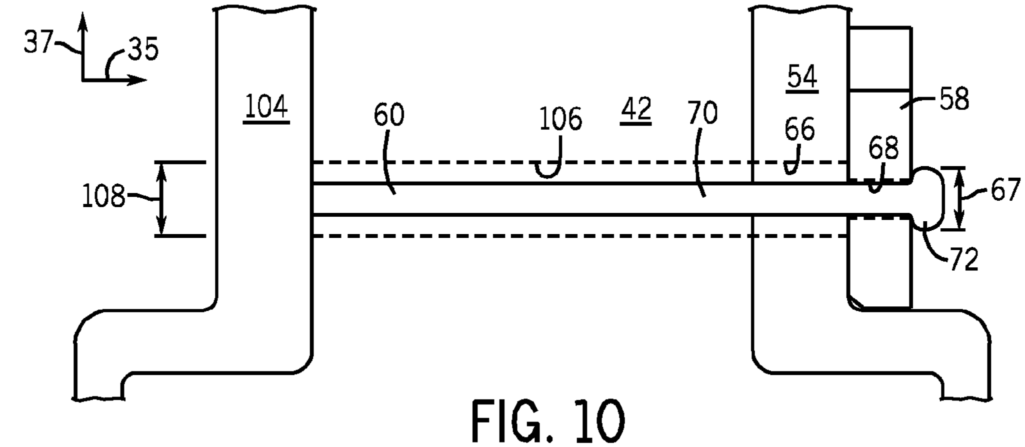
FIG. 10 is a detailed cross-sectional side view of an alternative embodiment of the rotor and lug in which the lug is coupled to a second cover plate on a substantially opposite axial side of the rotor from the first cover plate in accordance with certain embodiments of the present technique.

FIG. 10 is a detailed cross-sectional side view of an alternative embodiment of rotor 42 and lug 60 in which lug 60 is coupled to a second cover plate 104 on a substantially opposite axial side of rotor 42 from the first cover plate 54. Specifically, cover plate 54 is mounted on a downstream (i.e., direction of flow of hot combustion gases) axial side of rotor 42, while cover plate 104 is mounted on an upstream axial side. In this configuration, lug 60 is rigidly coupled to cover plate 104, and includes a shaft 70 that extends from one axial side of rotor 42 to the other axial side. The extended lug 60 passes through a hole 106 within rotor 42. A diameter 108 of hole 106 is larger than the diameter 67 of head 72 of lug 60 such that lug 60 may pass through hole 106 during assembly. Similar to embodiments described above, lug 60 passes through hole 66 in cover plate 54 and hole 68 in axial retention ring assembly 58. In this configuration, when axial retention ring assembly 58 is secured to shaft 70, axial retention ring assembly 58 blocks translation of cover plate 54 in axial direction 35 by contact between ring assembly 58 and head 72. Furthermore, because cover plate 104 is rigidly coupled to lug 60 and disposed adjacent to rotor 42, contact between ring assembly 58 and head 72 blocks axial movement of cover plate 104. Consequently, cover plates 54 and 104 are secured in axial direction 35 without the use of bolts, screws, pins or other fasteners that may be dropped into turbine 18 during maintenance.

Figure 11:
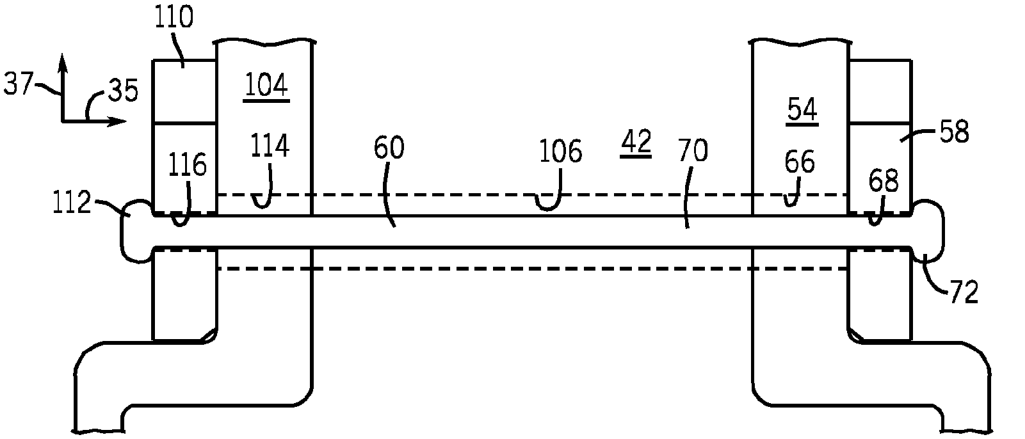
FIG. 11 is a detailed cross-sectional side view of a further embodiment of the rotor and lug in which the lug is secured to the second cover plate by a second axial retention ring assembly in accordance with certain embodiments of the present technique.

FIG. 11 shows a detailed cross-sectional side view of a further embodiment of rotor 42 and lug 60 in which lug 60 is secured to the second cover plate 104 by a second axial retention ring assembly 110. In this configuration, lug 60 includes a first head 72 and a second head 112. Similar to the previously described embodiments, lug 60 passes through hole 66 in cover plate 54 and hole 68 in axial retention ring assembly 58. Furthermore, lug 60 passes through a hole 114 in cover plate 104 and a hole 116 in axial retention ring assembly 110. When axial retention ring assemblies 58 and 110 are secured to substantially opposite ends of shaft 70, axial retention ring assemblies 58 and 110 block translation of cover plates 54 and 104 in axial direction 35 by contact between ring assembly 58 and head 72, and contact between ring assembly 110 and head 112. Consequently, cover plates 54 and 104 are secured in axial direction 35 without the use of bolts, screws, pins or other fasteners that may be dropped into turbine 18 during maintenance. Further embodiments may employ a combination of lug attachment points. For example, certain embodiments may include lugs 60 coupled to rotor 42 and buckets 40. Other embodiments may employ lugs 60 that extend from cover plate 54 to cover plate 104, and lugs 60 coupled to buckets 40.

Figure 12:
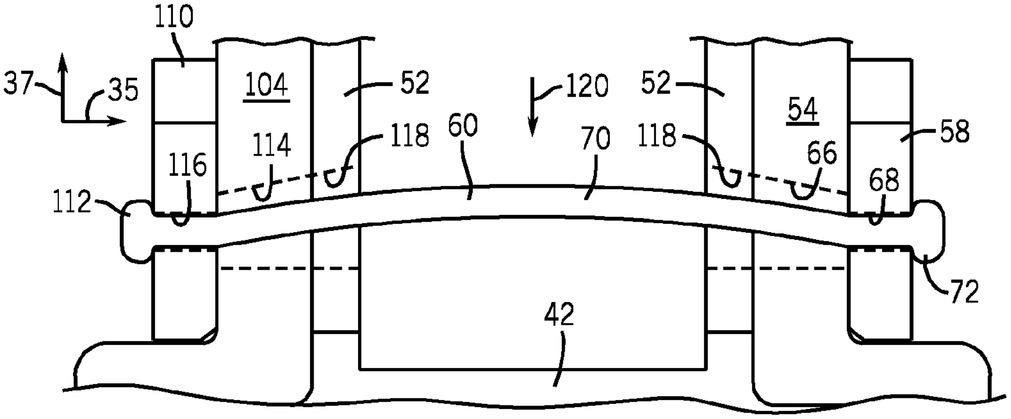
FIG. 12 is a detailed cross-sectional side view of a further embodiment of the rotor and lug in which a curved lug extends from one cover plate to another cover plate on substantially opposite axial sides of the rotor in accordance with certain embodiments of the present technique.

Certain embodiments may employ curved lugs or resilient lugs that bias the ring assembly 58 toward the cover plate 54. For example, FIG. 12 presents a detailed cross-sectional side view of a further embodiment of rotor 42 and lug 60 in which a curved lug 60 extends from cover plate 54 to cover plate 104. In the illustrated embodiment, lug 60 passes through holes 118 in shank 52 of bucket 40. As seen in FIG. 11, the shape of holes 118 and 114 are particularly configured to accommodate the curved shape of lug 60. The process of cover plate attachment may include applying a force 120 in radial direction 37 to curved lug 60 to reduce the degree of curvature, thus extending the length of curved lug 60. Cover plates 54 and 104, and ring assemblies 58 and 110 may then be attached. The force 120 may then be removed from curved lug 60, causing curved lug 60 to bias ring assemblies 58 and 110 toward cover plates 54 and 104, respectively. A similar arrangement may be employed for lugs 60 coupled to rotor 42 and buckets 40. Alternatively, a resilient lug 60 may be employed to bias the ring assemblies 58 and 110 toward cover plates 54 and 104, respectively. The resilient lug may be composed of a material that enables lug 60 to stretch along its longitudinal axis. As with the curved lug 60, during assembly a force may be applied to stretch the resilient lug 60 in axial direction 35 prior to attachment of ring assemblies 58 and 110. After ring assemblies 58 and 110 have been secured to rotor 42, the force may be removed, inducing resilient lug 60 to bias ring assemblies 58 and 110 toward cover plates 54 and 104, respectively. This configuration may provide enhanced retention of ring assemblies 58 and 110.

Further embodiments may employ alternative interlocking systems to secure cover plates 54 to rotor 42. For example, an alternative segmented ring may include interlocking features oriented in a radially inward direction and circumferentially spaced about the ring. To attach cover plates 54, the interlocking features within segments of the alternative ring may be aligned with the lugs 60. The ring may then be directed radially inward such that each interlocking feature captures a lug. This configuration may reduce the number of parts that may be dropped within turbine 18 during maintenance. Further alternative interlocking systems configured to capture lugs 60 and secure cover plates 54 in axial direction 35 may be employed in alternative embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:

a turbine engine, comprising:

a turbine stage comprising a turbine rotor having a plurality of blades disposed in a first annular arrangement;

a plurality of cover plates disposed in a second annular arrangement along interfaces between the turbine rotor and the blades;

a plurality of lugs coupled to the turbine stage; and a first ring coupled to the plurality of lugs, wherein the first ring is configured to block axial movement of the plurality of cover plates to hold the plurality of cover plates to the turbine stage, the first ring comprises a plurality of first interlocking features, and the first ring is configured to rotate about a rotational axis of the turbine stage in a first direction until the first interlocking features at least partially capture the plurality of lugs.

2. The system of claim 1, wherein the plurality of lugs are integral with the turbine rotor.

3. The system of claim 1, wherein the plurality of lugs are integral with the blades.

4. The system of claim 1, wherein the plurality of lugs extend axially through the turbine stage between opposite axial sides, and the plurality of lugs secure cover plates on both of the opposite axial sides.

5. The system of claim 1, wherein the plurality of lugs each comprise a resilient feature configured to bias the respective lug inwardly toward the turbine stage.

6. The system of claim 1, wherein the first ring is segmented into a plurality of ring segments defining a third annular arrangement.

7. The system of claim 1, comprising a second ring having a plurality of second interlocking features, the second ring is configured to rotate about the rotational axis of the turbine stage in a second direction until the second interlocking features at least partially capture the plurality of lugs, the first and second directions are opposite from one another, and each pair of first and second interlocking features is disposed about opposite circumferential sides of each respective lug after rotation of both the first and second rings.

8. The system of claim 7, wherein the first ring is segmented into a first plurality of ring segments defining a third annular arrangement, and the second ring is segmented into a second plurality of ring segments defining a fourth annular arrangement.

9. A system, comprising:

a turbine stage, comprising:

a lug having a shaft and a head sized larger than the shaft, wherein the shaft and head are configured to extend through a cover plate, and the lug is configured to receive an interlocking feature between the cover plate and the head, wherein the interlocking feature is configured to block axial movement of the cover plate to hold the cover plate to the turbine stage;

a first ring having the interlocking feature; and a second ring configured to interlock with the first ring, wherein the first and second rings rotate in opposite directions to capture the lug.

10. The system of claim 9, wherein the lug is integral with a turbine rotor or a turbine blade of the turbine stage.

11. The system of claim 9, wherein the shaft comprises a curved shape configured to bend to bias the head inwardly toward the turbine stage.

12. The system of claim 9, wherein the lug extends axially through the turbine stage between opposite axial sides, and the lug secures said cover plate and another cover plate located on a respective one of the opposite axial sides.

13. The system of claim 9, comprising said cover plate being one of a plurality of cover plates disposed in a first annular arrangement along interfaces between a turbine rotor and blades of the turbine stage, wherein the lug is one of a plurality of lugs disposed in a second annular arrangement, and each lug of the plurality of lugs is configured to receive a respective interlocking feature between a respective cover plate and the head of the lug.

14. A system, comprising:

a turbine stage, comprising:

a first ring comprising a first plurality of interlocking features configured to at least partially capture a plurality of lugs to retain a plurality of cover plates, wherein the first plurality of interlocking features comprises a plurality of hooks configured to engage and disengage the plurality of lugs via rotation of the first ring.

15. The system of claim 14, comprising a second ring having a plurality of tabs configured to extend at least partially into the plurality of hooks of the first ring, wherein the first and second rings are configured to rotate in opposite directions to substantially capture the plurality of lugs between the hooks and tabs.

16. The system of claim 15, comprising the plurality of cover plates disposed in an annular arrangement over interfaces between a turbine rotor and a plurality of turbine blades of the turbine stage, the plurality of lugs extend from the turbine rotor in an axial direction through the cover plates, and the first and second rings capture the lugs between the cover plates and enlarged heads of the lugs.

* * * * *